US010272555B2

(12) United States Patent
Langdon, Jr.

(10) Patent No.: US 10,272,555 B2
(45) Date of Patent: Apr. 30, 2019

(54) CONCRETE ANCHOR DRIVER TOOL

(71) Applicant: Robert S. Langdon, Jr., Gilbert, AZ (US)

(72) Inventor: Robert S. Langdon, Jr., Gilbert, AZ (US)

( * ) Notice: Subject to any disclaimer, the term of this patent is extended or adjusted under 35 U.S.C. 154(b) by 117 days.

(21) Appl. No.: 15/681,070

(22) Filed: Aug. 18, 2017

(65) Prior Publication Data

US 2017/0341212 A1 Nov. 30, 2017

Related U.S. Application Data

(63) Continuation of application No. 14/636,779, filed on Mar. 3, 2015, now Pat. No. 9,844,866.

(Continued)

(51) Int. Cl.

| | |
|---|---|
| ***B23P 19/00*** | (2006.01) |
| ***B25D 17/00*** | (2006.01) |
| ***B25B 31/00*** | (2006.01) |

(52) U.S. Cl.

CPC .............. *B25D 17/00* (2013.01); *B25B 31/00* (2013.01); *B25D 2217/0007* (2013.01); *Y10T 29/49833* (2015.01)

(58) Field of Classification Search

CPC ........... B25B 3/00; B25B 27/00; B25B 27/12; B25D 17/00; B25D 31/00;

(Continued)

(56) References Cited

U.S. PATENT DOCUMENTS

| | | | |
|---|---|---|---|
| 3,779,105 | A | 12/1973 | Triplett et al. |
| 4,218,795 | A | 8/1980 | Ernst et al. |

(Continued)

FOREIGN PATENT DOCUMENTS

| | | | |
|---|---|---|---|
| DE | 20108960 | U1 | 10/2001 |
| DE | 102008048672 | B1 | 3/2010 |

(Continued)

OTHER PUBLICATIONS

Langdon, Jr., Robert S., European Patent Office, EU Application No. 15761602.0-1709/3116687, European Search Report, dated Sep. 12, 2017, Reference No. 37329EP1.

(Continued)

*Primary Examiner* — Lee D Wilson

(74) *Attorney, Agent, or Firm* — Schmeiser, Olsen & Watts LLP

(57) ABSTRACT

The disclosed concrete anchor driver tool is coupled to a rotary hammer drill to install a concrete anchor. The tool includes a rod having multi-faceted bolt head end, such as a hexagonal bolt head end, and a socket having a multi-faceted opening in the socket end of the socket. The socket is slipped over the rod and held against the bolt head end of the rod by a compressible spring. The concrete anchor driver tool is operated by coupling the concrete anchor driver tool to a rotary hammer drill, slipping the socket over the concrete anchor, and operating the drill in the hammer mode to hammer the concrete anchor bolt into the concrete. The rotary hammer drill is then put in rotate mode and used to rotate the concrete anchor driver tool rod, which rotates the socket, which, in turn, tightens the nut on the concrete anchor.

12 Claims, 12 Drawing Sheets

Related U.S. Application Data

(60) Provisional application No. 61/952,398, filed on Mar. 13, 2014.

(58) Field of Classification Search
CPC .... B25D 2217/0007; B23P 9/00; B23P 11/00; B23P 19/00
See application file for complete search history.

(56) References Cited

U.S. PATENT DOCUMENTS

| | | | | |
|---|---|---|---|---|
| 4,890,779 | A | 1/1990 | Giannuzzi | |
| 5,168,781 | A | 12/1992 | Tenuta | |
| 5,638,909 | A | 6/1997 | Henderson | |
| 5,775,186 | A | 7/1998 | Rahm | |
| 5,988,026 | A | 11/1999 | Reckelhoff et al. | |
| 5,992,272 | A | 11/1999 | Fortner | |
| 6,758,005 | B2 | 7/2004 | Teper | |
| 7,124,665 | B1 | 10/2006 | Chen | |
| 7,469,456 | B2 | 12/2008 | Warfield | |
| 8,424,180 | B2 | 4/2013 | Wallek | |
| 9,321,165 | B1 | 4/2016 | Perry et al. | |
| 9,844,866 | B2 * | 12/2017 | Langdon, Jr. .......... | B25D 17/00 |
| 2005/0051596 | A1 | 3/2005 | Estes | |
| 2006/0065693 | A1 | 3/2006 | Eklund | |
| 2013/0161038 | A1 | 6/2013 | Prunean | |
| 2015/0258672 | A1 * | 9/2015 | Langdon, Jr. .......... | B25D 17/00 29/432 |
| 2017/0036329 | A1 | 2/2017 | Santamarina et al. | |
| 2017/0341212 | A1 * | 11/2017 | Langdon, Jr. .......... | B25D 17/00 |

FOREIGN PATENT DOCUMENTS

| | | | |
|---|---|---|---|
| EP | 2265413 | B1 | 10/2015 |
| ES | 2558380 | | 10/2015 |
| JP | 07256565 | A | 10/1995 |
| SU | 1150060 | A | 4/1985 |
| WO | 2009115268 | A1 | 9/2009 |

OTHER PUBLICATIONS

Langdon, Robert S., Intl. Serial No. PCT/US2015/018860, International Search Report and Written Opinion, dated Jun. 30, 2015.

* cited by examiner

FIG. 5
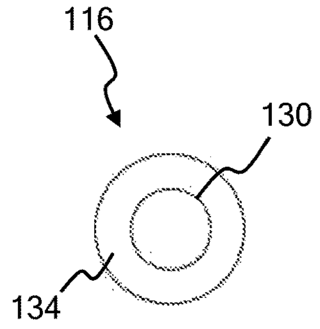
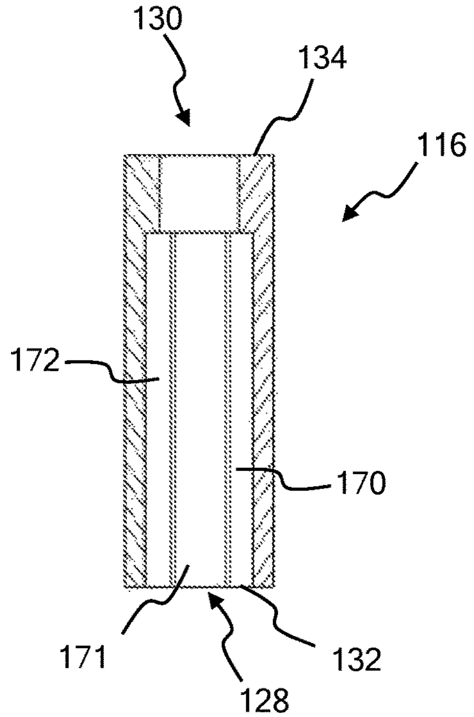
FIG. 6
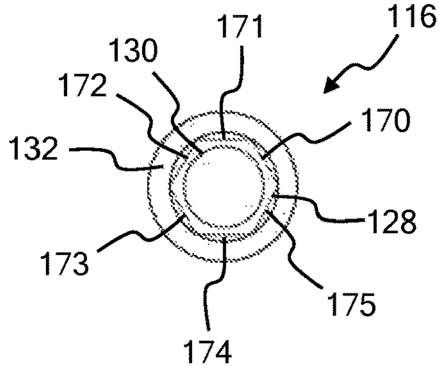
FIG. 7

CONCRETE ANCHOR DRIVER TOOL

CROSS REFERENCE TO RELATED APPLICATIONS

This application claims priority to U.S. patent application to Robert S. Langdon Jr., entitled "Concrete Anchor Driver Tool", Ser. No. 14/636,779, filed Mar. 3, 2015, which claims priority to U.S. Provisional Patent Application to Robert S. Langdon Jr., entitled "Concrete Anchor Driver Tool", Ser. No. 61/952,398, Filed Mar. 13, 2014, the disclosures of which are hereby incorporated entirely herein by reference.

BACKGROUND OF THE INVENTION

Technical Field

This invention relates to an anchor driver tool. More particularly, the invention relates to a concrete anchor driver tool for installing a concrete anchor fastener into a concrete or masonry surface.

State of the Art

Concrete anchors are a type of fastener used to attach items to a concrete, cement, stone, or other masonry surface. Concrete anchors can include a threaded concrete anchor bolt that is fixedly inserted into concrete, and a nut that threads onto the concrete anchor bolt. A concrete anchor can be installed by drilling a hole in the concrete or masonry surface and then pounding the concrete anchor bolt into the hole, with a hammer for example. However, the nut and threads of the concrete anchor can be damaged by striking them with the hammer. When the concrete anchor bolt is fully pounded into the hole, a wrench must be used to rotate the nut tight against the concrete.

Having to use multiple different tools, a drill, a hammer, and a wrench, is not optimal, and hammering and wrenching require the installer to be positioned on their hands and knees, which is time-consuming, uncomfortable and can cause bodily injury to the installer. Accordingly, what is needed is a concrete anchor driver tool that holds a hammer drill striking surface on the end of the concrete anchor bolt while the concrete anchor bolt is being driven into the hole, can be operated from a standing position, and also rotates and tightens the concrete anchor nut onto the concrete anchor bolt once the concrete anchor bolt is driven into the concrete.

BRIEF DESCRIPTION OF THE DRAWINGS

FIG. 5 shows an end view of a drive end 122 of an embodiment of a socket 116;

FIG. 6 shows a cutaway side view of socket 116 of FIG. 5;

FIG. 7 shows an end view of a socket end 132 of socket 116 of FIG. 5;

DETAILED DESCRIPTION OF EMBODIMENTS OF THE INVENTION

Figure 1:
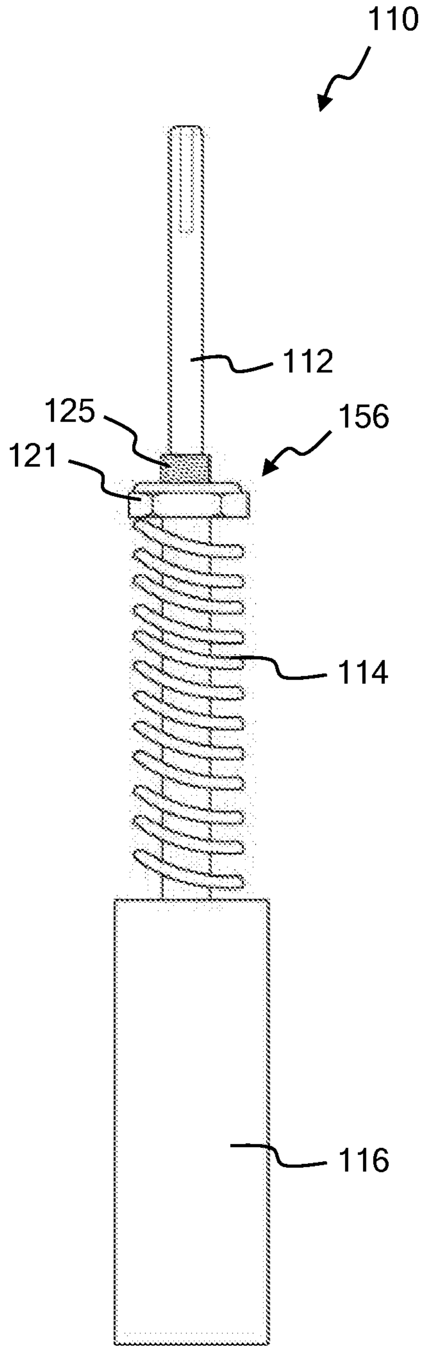
FIG. 1 shows a side view of an embodiment of an anchor driver tool 110.

As discussed above, embodiments of the disclosed invention relate to a concrete anchor driver tool for installing a concrete anchor fastener into a concrete or masonry surface.

Disclosed herein is a concrete anchor driver tool that is used as a drill bit of a hammer drill. The concrete anchor driver tool includes a rod, a socket, and a spring. The rod has a shank end that couples to the hammer drill, and an opposing multi-faceted bolt head end. The socket and the spring are slipped over the rod and are captured on the rod between a spring retaining device and the multi-faceted bolt head end. The spring biases the socket against the multi-faceted bolt head end of the rod. The socket is placed over a concrete anchor such that the bolt head end of the rod is against the driven end of the concrete anchor bolt. The hammer drill is used in hammer mode to apply hammer pressure to the concrete anchor bolt through the concrete anchor driver tool. The socket extends over the concrete anchor bolt and nut, and prevents the concrete anchor nut from spinning down the threads of the concrete anchor bolt. The socket also holds the concrete anchor nut in its preferred position to ensure maximum penetration of the concrete anchor shaft into the concrete while the concrete anchor is being driven into the concrete. Once the concrete anchor is installed, the hammer drill is switched to rotate mode and used to rotate the nut down the threads of the anchor shaft, and then to tighten the nut against the concrete.

Generally, a concrete anchor is installed in one of several ways. First a drill is used to drill a hole into the concrete or masonry material to receive the concrete anchor. A rotary hammer drill may be used in the drill (rotate) mode, with a drill bit to drill the hole in the concrete. Once the hole is drilled, the concrete anchor can be installed into the hole. The concrete anchor can be installed into the hole by manually hammering the concrete anchor bolt down into the hole. This can be difficult and time-consuming manual process. In addition, manually hammering the concrete anchor bolt into the hole can damage the concrete anchor if the hammer accidentally strikes the concrete anchor nut or the concrete anchor bolt threads. It also means the installer needs several tools, including a hammer, a drill and a wrench. The hammering process is performed in a kneeling position when the concrete anchor bolts are floor mounted. Thus, the installer is constantly changing tools, standing up, and then kneeling down, all of which takes time, energy, and can cause discomfort and injury.

Instead of using a hammer, a rotary hammer drill (also known as a chipping drill or rotary chipping drill) can be used to pound the concrete anchor bolt into the hole. This automates the hammer pounding. It does not, however, alleviate the need for several tools, or repeatedly alternating between standing and kneeling positions. For threaded concrete anchor bolts with a rotatable anchor nut, the anchor nut must stay at the top of the threaded anchor bolt so the anchor bolt can be pushed as far as possible into the hole. Pounding and vibration tends to cause the nut to spin down the threaded concrete anchor bolt. Therefore, whether the installer is using a hammer or a rotary hammer drill to pound the concrete anchor bolt into the hole, the installer must periodically stop and rotate the anchor nut back to the top. Once the threaded concrete anchor bolt is pounded all the way into the hole, a wrench is used to rotate the anchor nut down on the threaded concrete anchor bolt until the nut is against the concrete. This repeated use of the wrench to move the anchor nut back up to the top of the concrete anchor bolt, and then to tighten the concrete anchor nut on the anchor bolt once the concrete anchor bolt is installed in the hole, is awkward and time consuming. Using a wrench adds to the number of tools needed to install the concrete anchor, and requires the installer to repeatedly alternate between a standing and kneeling position, or to repeatedly climb up and down a ladder if a ladder is used. It is, therefore, desirable to have a concrete anchor driver tool that holds the concrete anchor nut in position on the concrete anchor bolt while the concrete anchor bolt is being driven into the hole, and that also rotates and tightens the concrete anchor nut onto the concrete anchor bolt once the concrete anchor bolt has been driven in the concrete hole.

Additionally, when a rotary hammer drill is used to pound the concrete anchor bolt into the hole, it is difficult to hold the rotary hammer drill bit (or other shaft device used to pound the concrete anchor bolt) against the top of the concrete anchor bolt. The drill bit tends to slip off the concrete anchor bolt and may also damage the top of the concrete anchor bolt. It is desirable to have a tool that secures the pounding end of the rotary hammer drill against the driven end of the concrete anchor bolt. It is also desirable to have a concrete anchor driver tool that does not damage the concrete anchor during installation, that requires a minimum number of tools during installation of the concrete anchor, and that can be used easily in any installation position without repeated kneeling or ladder climbing.

In embodiments of the disclosed invention, a rotary hammer drill is used in the drill (rotate) mode, with a drill bit, to drill holes in concrete. The concrete anchors are then placed into the holes. The drill bit of the rotary hammer drill is then replaced with the disclosed anchor driver tool. The rotary hammer drill uses the rod of the anchor driver tool to apply hammer pressure to the concrete anchor bolt. The rotary hammer drill is used in the hammer mode to push the concrete anchor bolt into the concrete. The socket of the disclosed anchor driver tool holds the nut of the concrete anchor from rotating, so it does not move down on the concrete anchor bolt. Once the socket end of the socket hits concrete, continued hammer pressure will compress the spring and allow the concrete anchor bolt to be pushed deeper into the hole. Once the concrete anchor bolt is pushed as far as possible into hole, the rotary hammer drill is switched to drill (rotate) mode. The rotary hammer drill rotates the rod of the concrete anchor driver tool, which rotates the bolt head end of the rod. Rotating the bolt head of the rod rotates the socket, which in turn rotates the nut down the concrete anchor bolt and tightens the nut against the concrete. It is to be understood that although the use of a rotary hammer drill is discussed in this document, any tool may be used that couples to the shank end of a drill bit and possesses both rotation and pounding (hammering or chipping) capabilities. One of skill in the art will understand that rotary hammer drills are often called by other names and there any numerous types of tools which can both rotate a drill bit and use a bit to pound or chip. Any tool that couples to the shank end of the concrete anchor driver tool disclosed herein which can both rotate the concrete anchor driver tool and pound, chip, or hammer with the concrete anchor driver tool is suitable.

While the concrete anchor driver tool is used in hammer mode, the bolt head end of the rod does not rotate, which prevents the socket from rotating. The socket holds the concrete anchor driver nut from rotating, which prevents the concrete anchor nut from moving down the concrete anchor bolt during pounding of the concrete anchor bolt into the hole. The bolt head end of the concrete anchor driver tool rod rotates the socket when the anchor driver tool is used in the rotate mode. The socket can slide up and down the rod and rotate the concrete anchor nut to install the nut onto the concrete anchor bolt.

Thus, with the disclosed concrete anchor driver tool, the socket prevents the concrete anchor nut from spinning down the threads of the concrete anchor bolt, and holds the concrete anchor nut in its preferred position to ensure maximum penetration of the concrete anchor bolt into the concrete. The disclosed concrete anchor driver tool protects the concrete anchor assembly, including both the concrete anchor nut and the concrete anchor bolt threads from damage during installation, and facilitates a perfect hammer strike to the concrete anchor head, preventing the concrete anchor bolt from bending. The disclosed concrete anchor driver tool eliminates the need for a hammer and a wrench or ratchet wrench, minimizing the number of tools required for concrete anchor installation. The disclosed concrete anchor driver tool eliminates the need for kneeling during installation of concrete anchors in the floor, and provides for easy installation of concrete anchors in walls and overhead installations.

Figure 2:
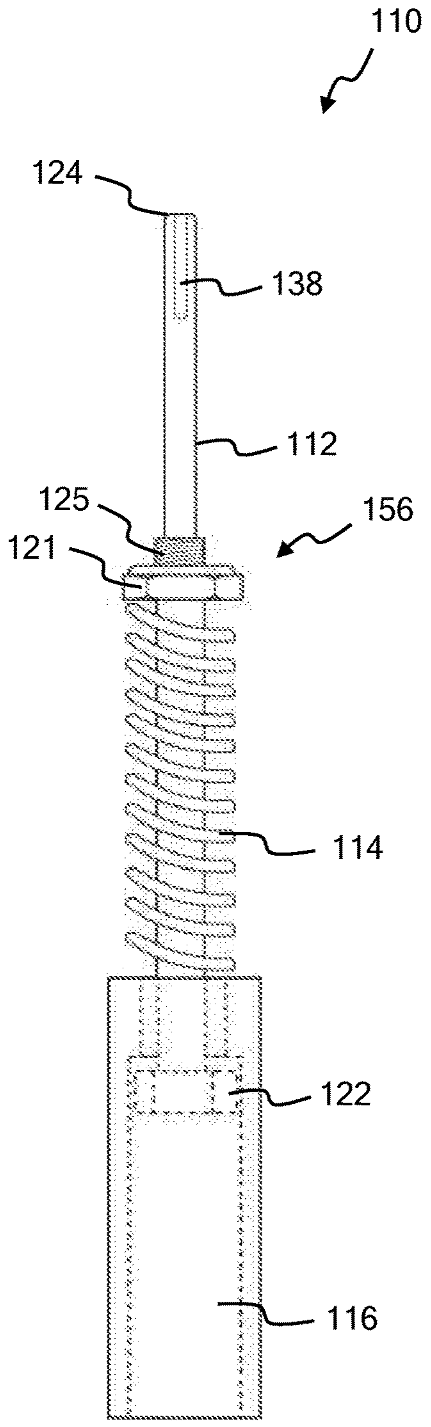
FIG. 2 shows a side view of anchor driver tool 110 of FIG. 1, with rod bolt head end 122 shown in dotted lines.
Figure 3:
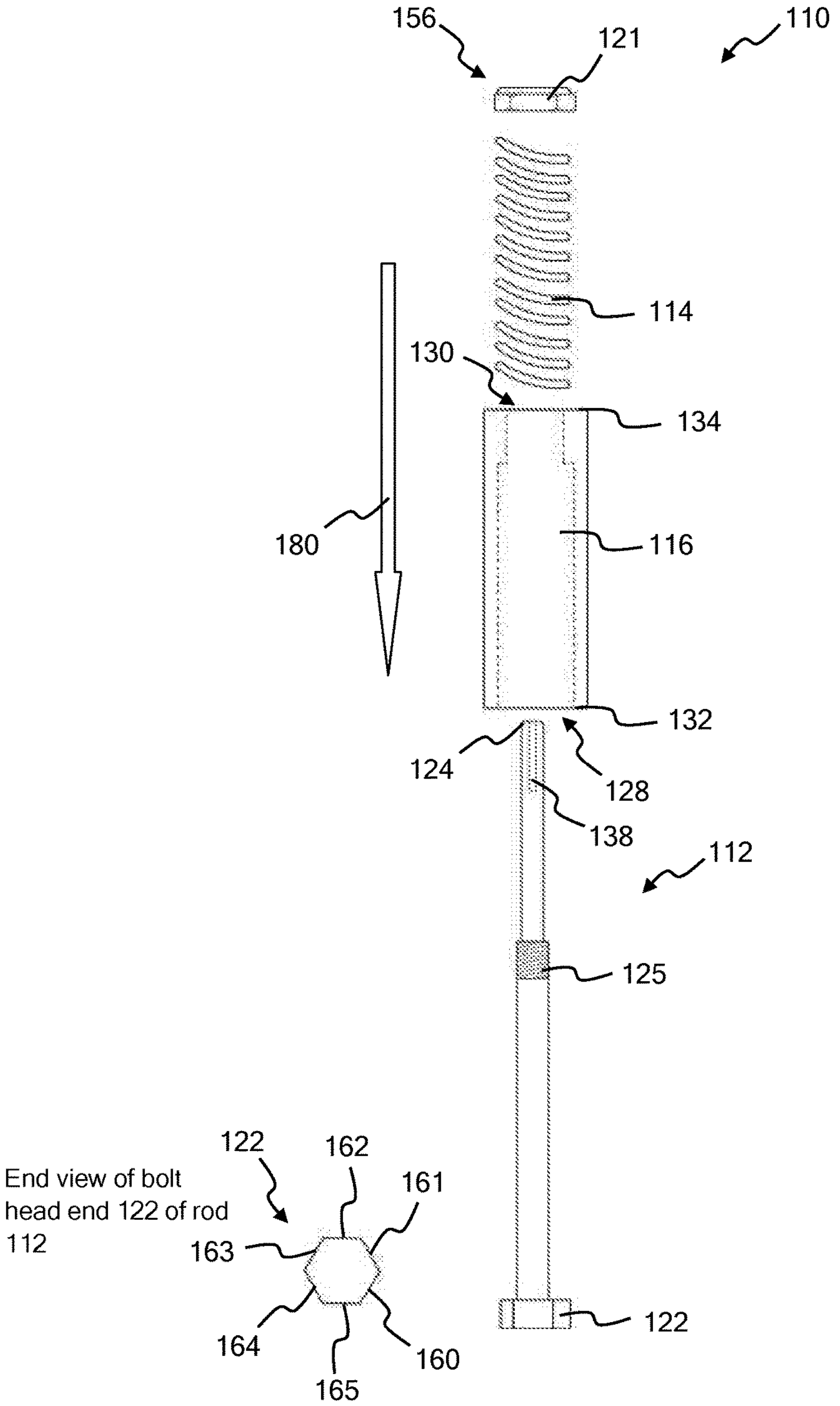
FIG. 3 shows an exploded view of anchor driver tool 110 of FIG. 1.

FIG. 1 through FIG. 3 show side views of an embodiment of a concrete anchor driver tool 110. FIG. 1 and FIG. 2 show side views of concrete anchor driver tool 110, with FIG. 2 showing, in dotted lines, some of the elements of concrete anchor driver tool 110 that are hidden by socket 116. FIG. 3 shows an exploded view of concrete anchor driver tool 110.

Concrete anchor driver tool 110 includes a rod 112, a socket 116, a compressible spring 114, and a spring retaining device 156. In this embodiment socket 116, spring 114, and spring retaining device 156 are slid over rod 112 in direction 180 from a shank end 124 of rod 112 (see FIG. 3). Referring back to FIG. 1, spring retaining device 156 is removeably coupled to rod 112, and holds socket 116 and spring 114 slidably on rod 112. Spring 114 is positioned between spring retaining device 156 and socket 116. In this embodiment, spring retaining device 156 is a lock nut 121, but this is not meant to be limiting.

Referring to FIG. 2 and FIG. 3, rod 112 has a multi-faceted bolt head end 122 and an opposing shank end 124. Shank end 124 couples to a drill chuck in place of a drill bit. The term “shank end” as used herein is consistent with the use of the word “shank” in the tool industry to mean an end that couples to a drill chuck. Shank end 124 can have many sizes and shapes to couple to different types, models, and/or brands of drills, rotary hammer drills, chipping drills, etc. In some embodiments, shank end 124 includes indents 138 as shown in FIG. 2 and FIG. 3, but this is not meant to be limiting. Shank end 124 can include any shape, cutouts, cross-sectional shapes, and sizes used to couple shank end 124 to a drill chuck. Any conventional shape, size, diameter and/or type of shank end that couples to a drill in place of a drill bit is useful with anchor driver tool 110.

Bolt head end 122 is multi-faceted in shape so it engages with, and can be rotated by, socket 116 (see FIG. 3 for example). In the embodiment shown in FIG. 1 through FIG. 3, multifaceted bolt head end 122 is hexagonally shaped, with six facets 160, 161, 162, 163, 164, and 165. Bolt head end 122 is shown as hexagonally (hex) shaped in the figures, but this is not meant to be limiting. A hexagonal bolt head end 122 is used when a six-point or hexagonal concrete anchor nut is used. Bolt head end 122 can also be octagon shaped. An octagon shaped bolt head end 122 is used when an eight-point concrete anchor nut is used. Bolt head end 122 can be any multi-faceted shape that allows a mating multi-faceted shape of a socket opening 128 of socket 116 to engage with (capture) bolt head end 122.

In this embodiment, multi-faceted bolt head end 122 is fixedly attached to rod 112, such as by welding or other fixed attachment means. This is not meant to be limiting, however. In some embodiments, multi-faceted bolt head end 122 is removeably attached to rod 112, such as, for example, in the embodiment of anchor driver tool 310 shown in FIG. 8 through FIG. 10 and described in the associated text.

Figure 4:
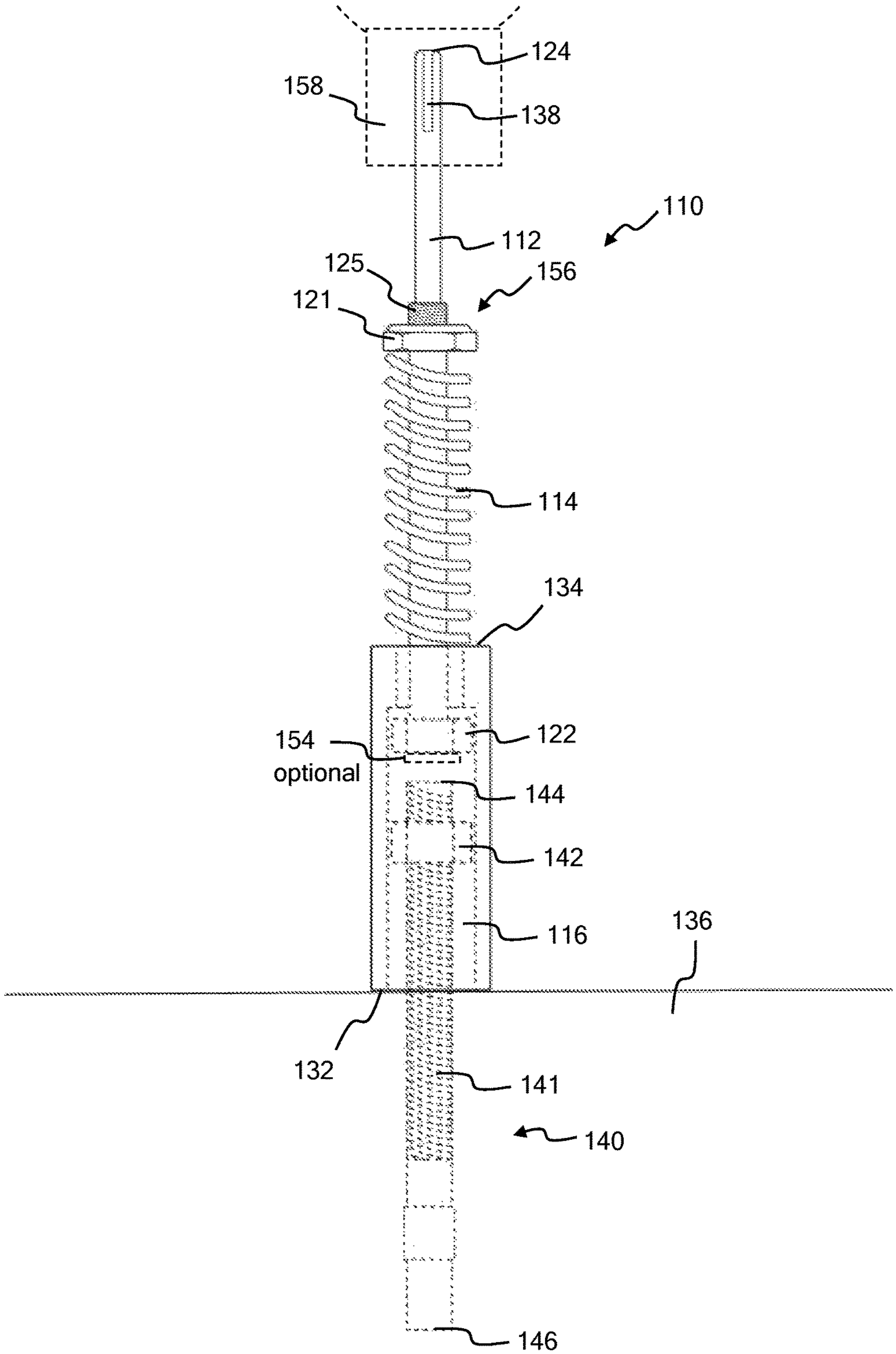
FIG. 4 shows an assembled view of anchor driver tool 110 of FIG. 1 in position over a concrete anchor 140, as during installation of concrete anchor 140 using concrete anchor driver tool 110.

Multi-faceted bolt head end 122 is placed against a drive end 144 of a concrete anchor 140 during use of concrete anchor tool 110, as shown in FIG. 4. FIG. 4 shows concrete anchor driver tool 110 positioned over a concrete anchor 140 as concrete anchor driver tool 110 is used to install concrete anchor 140. Multi-faceted bolt head end 122 of rod 112 transfers hammer pressure from a hammer drill 158 coupled to shank end 124 to the concrete anchor 140. In some embodiments, as shown in FIG. 4, bolt head end 122 has an optional rubber pad 154 coupled to it. Rubber pad 154 keeps bolt head end 122 from damaging driven end 144 of concrete anchor 140 when concrete anchor driver tool 110 is pounding concrete anchor 140 into concrete 136.

Socket 116, as shown in FIG. 5 through FIG. 7, is similar to a typical socket used to drive bolts and nuts with a socket wrench. FIG. 5 shows an end view of a drive end 134 of socket 116. FIG. 6 shows a cutaway side view of socket 116. FIG. 7 shows an end view of a socket end 132 of socket 116. Socket 116 has drive end 134 with a drive end opening 130, and socket end 132 opposing drive end 134. Socket 116 bounds a multi-faceted shaped socket opening 128 extending from socket end 132 throughout a portion of the length of socket 116. FIG. 7 shows an end view of socket 116 down multi-faceted socket opening 128. Socket opening 128 is sized and shaped to engage multi-faceted bolt head end 122 of rod 112. In this embodiment socket opening 128 is hexagonally shaped, with six facets 170, 171, 172, 173, 174, and 175 as shown in FIG. 6 and FIG. 7.

Referring back to FIG. 3, socket 116 slides over rod 112 from shank end 124 in this embodiment. Socket 116 has drive end opening 130 in drive end 134 so that socket 116 slides over rod 112 until bolt head end 122 is against drive end 134. Drive end opening 130 is large enough for shank end 124 to pass through drive opening 130. Drive end opening 130 is not large enough for multi-faceted bolt head end 122 to pass through. Socket 116 is slidably received on rod 112 through drive end opening 130. In this embodiment, drive end opening 130 is round, but drive end opening 130 can be any shape, so long as drive end opening 130 is large enough for shank end 124 to pass through drive end opening 130, and drive end opening 130 is not large enough for multi-faceted bolt head end 122 to pass through.

Socket 116 is designed such that socket opening 128 engages (captures) both bolt head end 122 and nut 142. "Engages" or "captures" is used herein to describe the typical mating of a bolt and socket. In other words, the socket rotates the bolt or nut when the socket and bolt or nut are sized and shaped to engage. In anchor driver tool 110 according to the invention, multi-faceted bolt head end 122 is sized and shaped to match the size and shape of concrete anchor nut 142 (see FIG. 4). Multi-faceted socket opening 128 in socket 116 is designed with a size and shape to capture both bolt head end 122 and concrete anchor nut 142. Thus, socket 116 is prevented from rotating when rod 112 and multi-faceted bolt head end 122 are not rotating. Conversely, socket 116 rotates when rod 112 and multi-faceted bolt head end 122 are rotated, such as by a rotary hammer drill, for example. Socket 116 likewise prevents nut 142 of concrete anchor 140 from rotating when rod 112 and bolt head end 122 are not rotating. And, nut 142 rotates with socket 116 when rod 112, bolt head end 122, and socket 116 are rotated, such as by a rotary hammer drill, for example. Bolt head end 122 and concrete anchor nut 142 are both size and shaped engage with socket opening 128 of socket 116. Socket opening 128, bolt head end 122, and concrete anchor nut 142 can be any size and shape, as long as socket opening 128 engages bolt head end 122 and nut 142. Socket opening 128 engages multi-faceted bolt head end 122 such that socket 116 is rotated in response to rod 112 being rotated.

Compressible spring 114 slides over rod 112 (FIG. 3) and is held between socket 116 and spring retaining device 156 (FIG. 2). Spring 114 is not large enough to slide over socket 116 or spring retaining device 156. Spring 114 is large enough to slide over shank end 124 of rod 112. Spring 114 is positioned between spring retaining device 156 and socket 116, as shown in FIG. 1 through FIG. 4. Spring 114 is compressible, such that it biases drive end 134 of socket 116 against bolt head end 122 of rod 112 (see FIG. 2 and FIG. 4). This spring pressure on socket 116 allows socket 116 to tighten concrete anchor nut 142 on concrete anchor bolt 141 once concrete anchor 140 is pounded into concrete 136. Compressible spring 114 also keeps socket 116 covering multi-faceted bolt head end 122, so that when rod 112 is rotated, socket 116 rotates multi-faceted bolt head end 122 and nut 142, and when rod 112 is not rotated, socket 116 prevents rotation of multi-faceted bolt head end 122 and nut 142.

Spring retaining device 156 is coupled to rod 112 between multi-faceted bolt head end 122 and shank end 124, as shown in FIG. 1 through FIG. 4. Spring retaining device 156 prevents spring 114 and socket 116 from being removed from rod 112 over shank end 124. In the embodiments shown in the figures, spring retaining device 156 is removably coupled to rod 112, so that spring retaining device 156 is removed from rod 112 to install and remove socket 116 and spring 114 onto rod 112. In some embodiments, spring retaining device 156 is fixedly coupled to rod 112, and multi-faceted bolt head end 122 is removed to install and remove socket 116 and spring 114 onto rod 112, such as, for example, the embodiment of anchor driver tool 310 shown in FIG. 8 through FIG. 10 and described in the accompanying text.

In the embodiment of anchor driver tool shown 110 shown in FIG. 1 through FIG. 4, spring retaining device 156 is lock nut 121. Lock nut 121 keeps socket 116 and spring 114 on rod 112. Lock nut 121 rotates onto threads 125 of rod 112 once socket 116, spring 114, and lock nut 121 are slid over rod 112 as shown in FIG. 3. Lock nut 121 is removably coupled to threads 125 of rod 112, and does not slide up and down rod 112. In some embodiments, spring retaining device 156 is some other element that is removeably or non-removeably coupled to rod 112 to hold socket 116 and spring 114 in place on rod 112. In some embodiments, spring retaining device 156 is retaining ring and a washer, as is shown in the embodiment of concrete anchor tool 510 shown in FIG. 10 through FIG. 13 and described in the accompanying text. Spring retaining device 156 can be any device or element attached to, or unitary with, rod 112 that keeps spring 114 and socket 116 in place on rod 112.

The method of using concrete anchor driver tool 110 according to the invention comprises coupling shank end 124 of rod 112 to a rotary hammer drill 158 (see FIG. 4, partially showing rotary hammer drill 158 in dotted lines). Shank end 124 is coupled to a chuck of rotary hammer drill 158 such as any conventional drill bit would be coupled to the chuck of a rotary hammer drill. As shown in FIG. 4, socket end 132 of socket 116 is slipped over a concrete anchor 140. Concrete anchor 140 in this embodiment includes concrete anchor bolt 141 and concrete anchor nut 142. Concrete anchor bolt 141 in this embodiment has driven end 144 and an expansion end 146. Concrete anchor 140 as shown in FIG. 4 has been placed into a predrilled hole in concrete 136. Rotary hammer drill 158 is used in hammer (chipping or pounding) mode—without rotation—to apply hammer pressure to concrete anchor 140 through rod 112, driving concrete anchor bolt 141 into the pre-drilled hole in concrete 136. Expansion end 146 of concrete anchor bolt 141 cannot be easily removed once driven into concrete 136. Socket 116 holds bolt head end 122 against driven end 144 of concrete anchor bolt 141, which eliminates hammer strike misses or misalignment causing slipping of the hammer drill on driven end 144. By keeping bolt head end 122 properly aligned and securely in place on driven end 144, concrete anchor driver tool 110 minimizes damage to concrete anchor 140, including bending of concrete anchor bolt 141.

Spring 114 biases socket 116 against bolt head end 122 of rod 112. As the rotary hammer drill drives concrete anchor bolt 141 into concrete 136, socket 116 compresses spring 114 against spring retaining device 156. Socket 116 engages nut 142 on concrete anchor bolt 141 during use of concrete anchor drive tool 110 to pound concrete anchor 140 into concrete 136. Rod 112 is not rotated by the rotary hammer drill when the rotary hammer drill is in hammer mode. Thus, socket 116 engages nut 142 and prevents nut 142 from rotating while concrete anchor 140 is being hammered into concrete 136. By preventing nut 142 from rotating while concrete anchor 140 is being hammered into concrete 136, concrete anchor drive tool 110 prevents nut 142 from vibrating and spinning downwards on concrete anchor bolt 141 during installation of concrete anchor 140. This eliminates the need to periodically interrupt hammering to rotate nut 142 back up to the top of concrete anchor bolt 141.

Once concrete anchor 140 is driven into concrete 136, rotary hammer drill 158 is switched to rotate mode. Rotary hammer drill 158 is then used to rotate rod 112, which rotates socket 116, which rotates and tightens nut 142 on concrete anchor bolt 141, completing the installation of concrete anchor 140. When rotary hammer drill 158 is in rotate mode and being used to rotate rod 112, socket 116, and nut 142, the pressure of compressible spring 114 on socket 116 holds socket 116 against nut 142, helping socket 116 tighten nut 142 of concrete anchor 140 against concrete 136.

Concrete anchor driver tool 110 advantageously uses socket 116 to hold bolt end 122 of rod 112 against driven end 144 of concrete anchor bolt 141. This allows rotary hammer drill 158 to hammer concrete anchor 140 into concrete 136 without bolt end 122 sliding off driven end 144 of concrete anchor bolt 141. In addition, socket 116 prevents nut 142 from rotating during the hammering process, preventing nut 142 from vibrating and moving downwards on concrete anchor bolt 141. After concrete anchor bolt 141 is hammered into concrete 136, socket 116 is used to rotate nut 142 on concrete anchor bolt 141, finishing the installation of concrete anchor 140. Concrete anchor driver tool 110 eliminates the use of a hammer and a wrench or ratchet during installation, minimizing the number of tools required to install concrete anchor 140. And concrete anchor driver tool 110 allows the installer to stand throughout the installation process, letting rotary hammer drill 158 and concrete anchor driver tool 110 do the work instead of manual labor on hands and knees.

Concrete anchor tool 110 can be used with any type of concrete anchor that uses a multi-faceted nut or a bolt head. The embodiments shown use a threaded concrete anchor bolt 141 and nut 142 that is threaded onto concrete anchor bolt 141, but this is not meant to be limiting. In other embodiments a concrete anchor is used that is shaped like a bolt, with a bolt head that rotates the whole concrete anchor. The concrete anchor is "screwed" into the concrete like a screw or bolt. The size and shape of bolt head end 122 and socket 116 of the anchor driver tool of the invention are selected such that socket 116 engages both bolt head end 122 of rod 112 and a concrete anchor bolt head of the concrete anchor.

Figure 8:
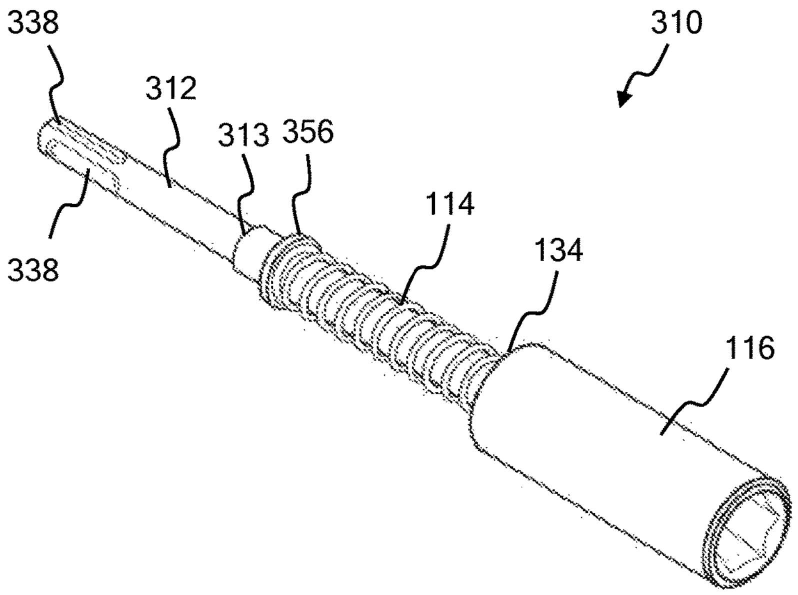
FIG. 8 shows a perspective view of an embodiment of an anchor drive tool 310.
Figure 9:
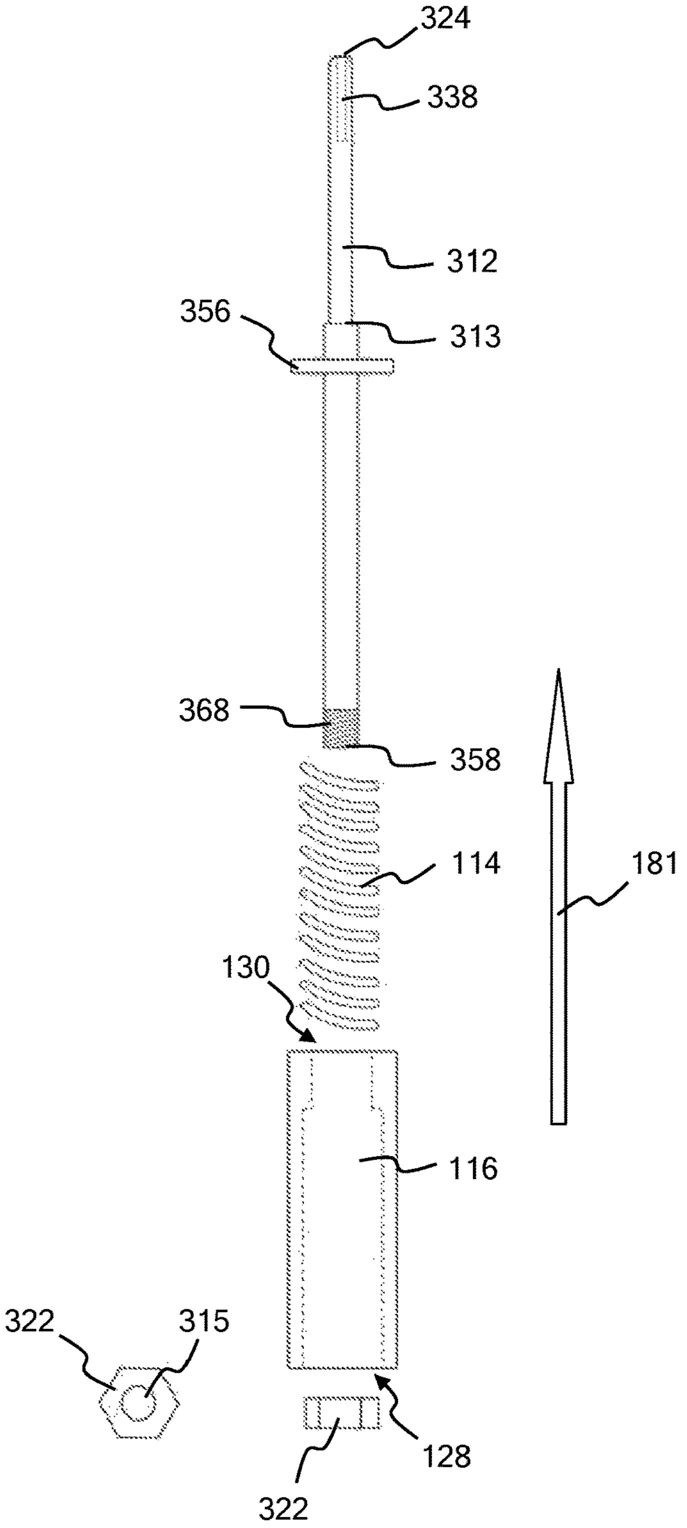
FIG. 9 shows an exploded view of anchor driver tool 310 of FIG. 8.
Figure 10:
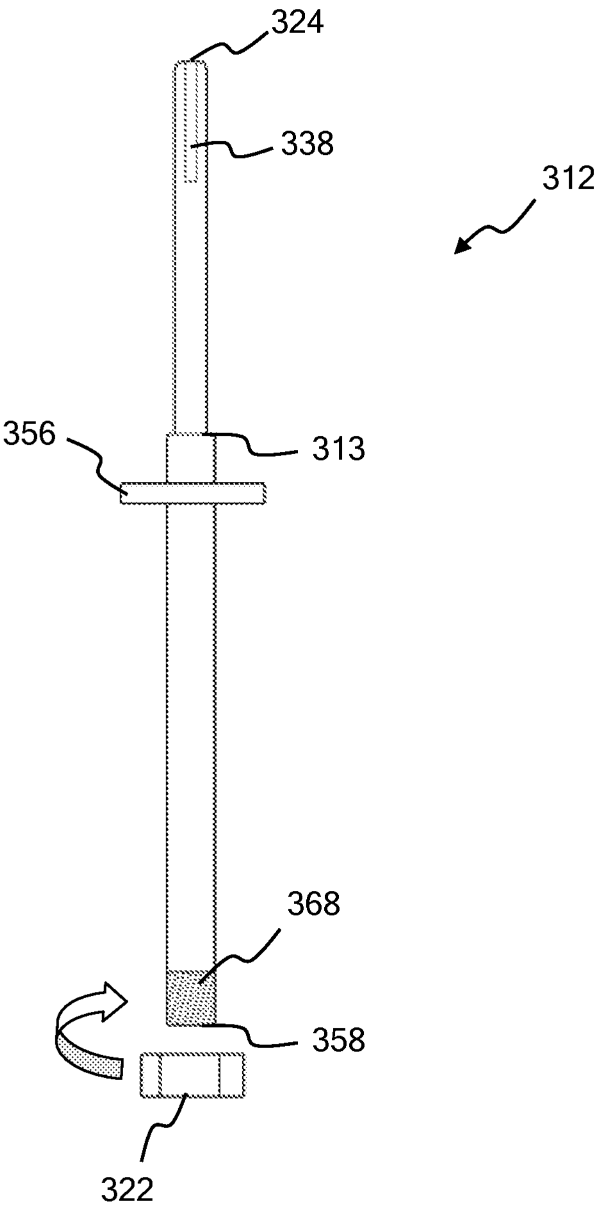
FIG. 10 shows a side view of a rod 312 of anchor driver tool 310 of FIG. 8.

FIG. 8 through FIG. 10 show an embodiment of a concrete anchor driver tool 310. Concrete anchor drive tool 310 is similar to concrete anchor driver tool 110, with similar numbers used to designate similar parts, except that in this embodiment, the spring retaining device is fixedly coupled to the rod, and the multi-faceted bolt head end is removeably coupled to the rod. In this embodiment the multi-faceted bolt head end is removed from the rod to install socket 116 and spring 114 on the rod.

FIG. 8 shows a perspective view of concrete anchor driver tool 310. FIG. 9 shows an exploded view of concrete anchor drive tool 310. FIG. 10 shows an exploded view of rod 312. Concrete anchor driver tool 310 includes a rod 312, spring 114, socket 116, and a spring retaining device 356.

As shown in FIG. 10, rod 312 is similar in design and purpose to rod 112, except that rod 312 includes a spring retaining device 356 which is fixedly coupled to rod 312. In this embodiment, spring retaining device 356 is an annular protrusion from rod 312 with a diameter larger than both the diameter of spring 114, and the diameter of opening 130. In this embodiment, spring retaining device 356 is formed as an integral part of rod 312. In some embodiments, spring retaining device 356 is welded to rod 312. Spring retaining device 356 keeps spring 114 and socket 116 from being removed from rod 312 via a shank end 324.

Rod 312 in this embodiment also includes indents 338, a radius step 313, a rod drive end 358, and threads 368, as shown in FIG. 9 and FIG. 10. A multi-faceted bolt head end nut 322 removeably couples to rod 312 to capture socket 116 and compressible spring 114 onto rod 312 (FIG. 9). In this embodiment, multi-faceted bolt head end nut 322 is removeably coupled to rod drive end 358 of rod 312 by engaging a threaded bolt hole 315 (FIG. 9) with threads 368 (FIG. 9 and FIG. 10), but this is not meant to be limiting. In some embodiments, multi-faceted bolt head end nut 322 is coupled to rod 312 using a set screw or any other coupling device which allows multi-faceted bolt head end nut 322 to be removeably coupled to rod 312.

Spring 114 and socket 116 slide over rod 312 in direction 181 from rod drive end 358, as shown in FIG. 9. Spring retaining device 356 keeps both spring 114 and socket 116 from sliding over shank end 324. Multi-faceted bolt head end nut 322 is coupled to rod drive end 358 of rod 312, capturing compressible spring 114 and socket 116 on rod 312. Compressible spring 114 biases socket 116 so that drive end 134 (FIG. 8) is pressed against multi-faceted bolt head end nut 322. Once assembled, anchor driver tool 310 is used the same as anchor driver tool 110.

Figure 11:
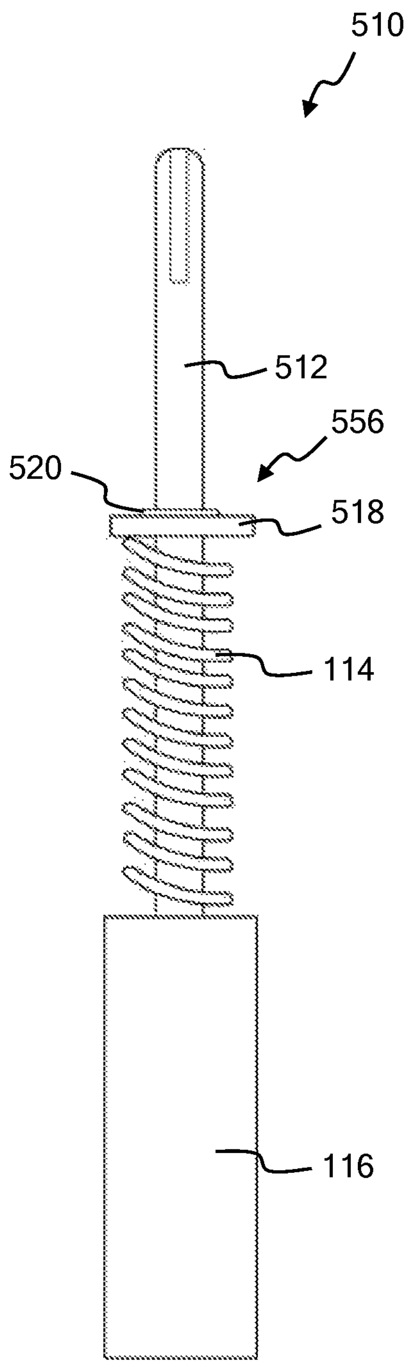
FIG. 11 shows a side view of an embodiment of an anchor driver tool 510.
Figure 12:
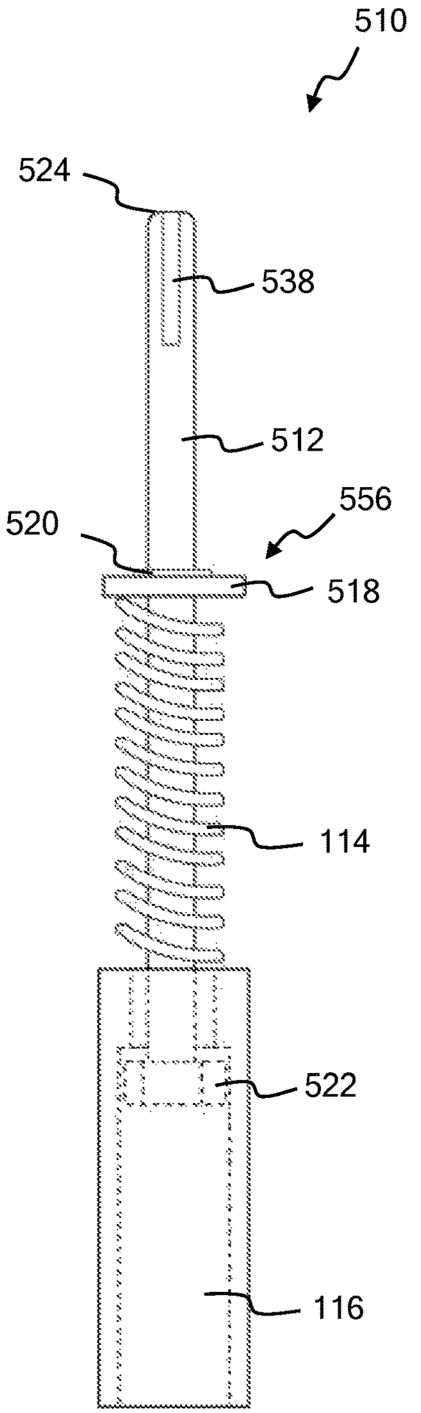
FIG. 12 shows a plan view of anchor driver tool 510 of FIG. 11, with rod bolt head end 522 shown in dotted lines.
Figure 13:
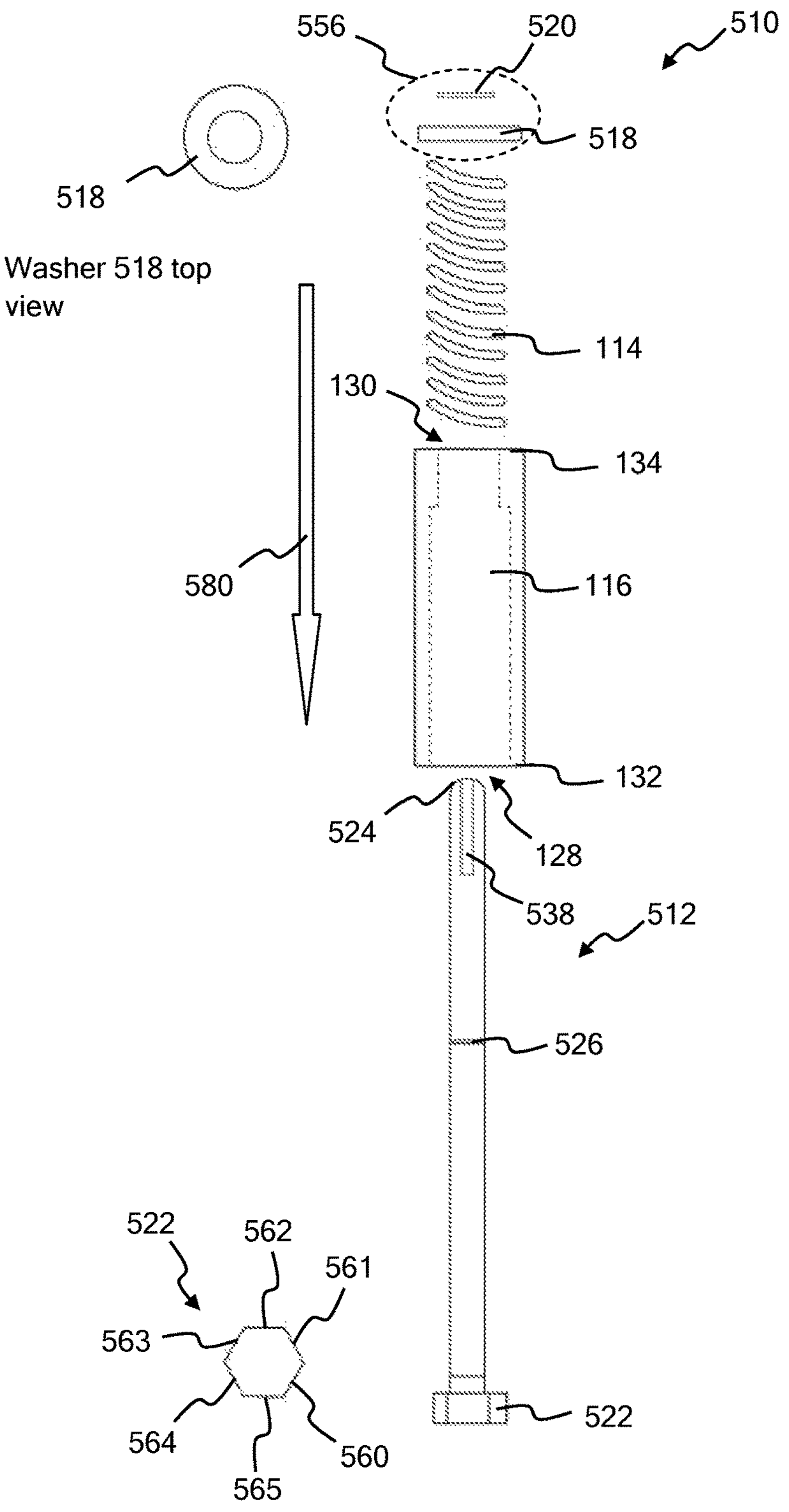
FIG. 13 shows an exploded view of anchor driver tool 510 of FIG. 1.

FIG. 11 through FIG. 13 show side views of an embodiment of a concrete anchor driver tool 510. Concrete anchor drive tool 510 is similar to concrete anchor driver tool 110, with similar numbers used to designate similar parts, except that in this embodiment, the spring retaining device is a retaining ring and a washer instead of a lock nut. FIG. 11 and FIG. 12 show a side view of concrete anchor driver tool 510, with FIG. 12 showing, in dotted lines, some of the elements of concrete anchor driver tool 510 that are hidden by socket 116. FIG. 13 shows an exploded view of concrete anchor driver tool 510.

Concrete anchor driver tool 510 includes a rod 512, socket 116, compressible spring 114, and a spring retaining device 556. In this embodiment socket 116, spring 114, and spring retaining device 556 are slid over rod 512 in a direction 580 from a shank end 524 of rod 512 (see FIG. 13). Referring back to FIG. 11, spring retaining device 556 is removeably coupled to rod 512, and holds socket 116 and spring 114 slidably on rod 512. Spring 114 is positioned between spring retaining device 556 and socket 116. In this embodiment, spring retaining device 556 is a retaining ring 520 and a washer 518, but this is not meant to be limiting.

Referring to FIG. 12 and FIG. 13, rod 512 has a multi-faceted bolt head end 522 and an opposing shank end 524. Shank end 524 couples to the drill chuck in place of a drill bit. In some embodiments, shank end 524 includes indents 538 as shown in FIG. 12 and FIG. 13, but this is not meant to be limiting.

Bolt head end 522 is multi-faceted in shape so it engages with, and can be rotated by, socket 116 (see FIG. 13 for example). In the embodiment shown in FIG. 11 through FIG. 13, multifaceted bolt head end 522 is hexagonally shaped, with six facets 560, 561, 562, 563, 564, and 565. Bolt head end 522 is shown as hexagonally (hex) shaped in the figures, but this is not meant to be limiting. Bolt head end 522 can be any multi-faceted shape that allows a mating multi-faceted shape of a socket opening 128 of socket 116 to engage with (capture) bolt head end 522.

In this embodiment, multi-faceted bolt head end 522 is fixedly attached to rod 512, such as by welding or other fixed attachment means. This is not meant to be limiting, however. In some embodiments, multi-faceted bolt head end 522 is removeably attached to rod 512, similar to the embodiment of anchor driver tool 310 shown in FIG. 8 through FIG. 10 and described in the associated text.

Concrete anchor driver tool 510 is used the same or similarly to concrete anchor driver tool 110 as shown in FIG. 4. Multi-faceted bolt head end 522 is placed against drive end 144 of concrete anchor 140 during use, as shown in FIG. 4 for multi-faceted bolt head end 122 and concrete anchor driver tool 110. Multi-faceted bolt head end 522 of rod 512 transfers the hammer pressure from a hammer drill coupled to shank end 524 to concrete anchor 140.

Referring to FIG. 13, socket 116 slides over rod 512 from shank end 524 in this embodiment. Socket 116 slides over rod 512 until bolt head end 522 is against drive end 134. Drive end opening 130 is large enough for shank end 524 to pass through drive opening 130. Drive end opening 130 is not large enough for multi-faceted bolt head end 522 to pass through. Socket 116 is slidably received on rod 512 through drive end opening 130. In this embodiment, drive end opening 130 is round, but drive end opening 130 can be any shape, so long as drive end opening 130 is large enough for shank end 524 to pass through drive end opening 130, and drive end opening 130 is not large enough for multi-faceted bolt head end 522 to pass through.

Multi-faceted socket opening 128 in socket 116 captures both bolt head end 522 and concrete anchor nut 142. Thus, socket 116 is prevented from rotating when rod 512 and multi-faceted bolt head end 522 are not rotating. Conversely, socket 116 rotates when rod 512 and multi-faceted bolt head end 522 are rotated, such as by a rotary hammer drill, for example. Socket 116 likewise prevents nut 142 of concrete anchor 140 from rotating when rod 512 and bolt head end 522 are not rotating. And, nut 142 rotates with socket 116 when rod 512, bolt head end 522, and socket 116 are rotated, such as by a rotary hammer drill, for example. Bolt head end 522 and concrete anchor nut 142 are both size and shaped engage with socket opening 128 of socket 116. Socket opening 128, bolt head end 522, and concrete anchor nut 142 can be any size and shape, as long as socket opening 128 engages bolt head end 522 and nut 142. Socket opening 128 engages multi-faceted bolt head end 522 such that socket 116 is rotated in response to rod 512 being rotated.

Compressible spring 114 slides over rod 512 (FIG. 13) and is held between socket 116 and spring retaining device 556 (FIG. 11 and FIG. 12). Spring 114 is not large enough to slide over socket 116 or spring retaining device 556. Spring 114 is large enough to slide over shank end 524 of rod 512. Spring 114 is positioned between spring retaining device 556 and socket 116, as shown in FIG. 11 through FIG. 13. Spring 114 is compressible, such that it biases drive end 134 of socket 116 against bolt head end 522 of rod 512 (see FIG. 12). This spring pressure on socket 116 allows socket 116 to tighten concrete anchor nut 142 on concrete anchor bolt 141 once concrete anchor 140 is pounded into concrete 136. Compressible spring 114 also keeps socket 116 covering multi-faceted bolt head end 522, so that when rod 512 is rotated, socket 116 rotates multi-faceted bolt head end 522 and nut 142, and when rod 512 is not rotated, socket 116 prevents rotation of multi-faceted bolt head end 522 and nut 142.

Spring retaining device 556 is coupled to rod 512 between multi-faceted bolt head end 522 and shank end 524, as shown in FIG. 11 through FIG. 13. Spring retaining device 556 prevents spring 114 and socket 116 from being removed from rod 512 over shank end 524. In the embodiments shown in the figures, spring retaining device 556 is removably coupled to rod 512, so that spring retaining device 556 is removed from rod 512 to install and remove socket 116 and spring 114 onto rod 512. In some embodiments, spring retaining device 556 is fixedly coupled to rod 512, and multi-faceted bolt head end 522 is removed to install and remove socket 116 and spring 114 onto rod 512, similar to the embodiment of anchor driver tool 310 shown in FIG. 8 through FIG. 10 and described in the accompanying text.

In the embodiment of anchor driver tool shown 510 shown in FIG. 11 through FIG. 13, spring retaining device 556 includes a washer 518 and a retaining ring 520. Washer 518 and retaining ring 520 keep socket 116 and spring 114 on rod 512. Retaining ring 520 slides into a retaining ring groove 526 in rod 512 (see FIG. 13) once socket 116, spring 114, and washer 518 are slid over rod 512. Retaining ring 520 is removably coupled to retaining ring groove 526 of rod 512, and does not slide up and down rod 512. In some embodiments, spring retaining device 556 is a retaining ring only, with no washer 518. In some embodiments, spring retaining device 556 is some other element that is removeably or non-removeably coupled to rod 512 to hold socket 116 and spring 114 in place on rod 512. Spring retaining device 556 can be any device or element attached to, or unitary with, rod 512 that keeps spring 114 and socket 116 in place on rod 512.

Figure 14:
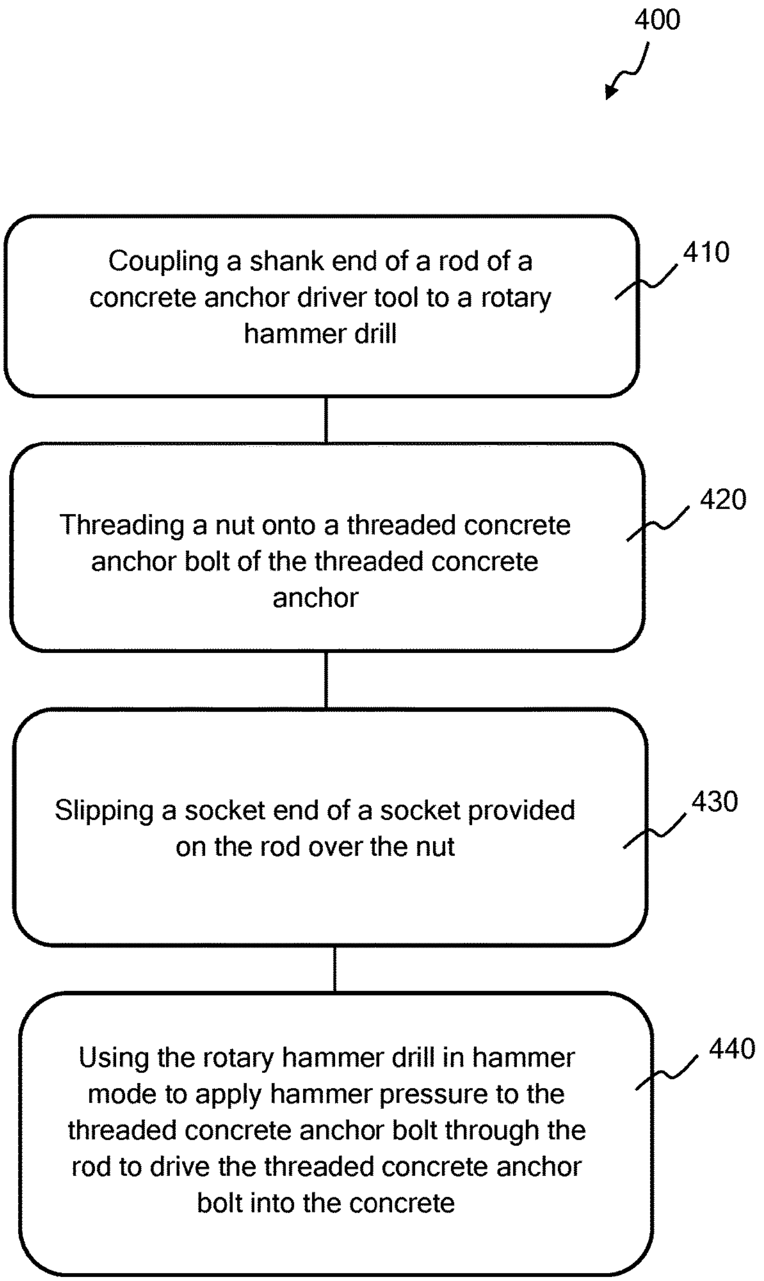
FIG. 14 shows a flow diagram of a method 400 of installing a concrete anchor.

FIG. 14 is a flow diagram of a method 400 of installing a threaded concrete anchor into concrete. Method 400 includes a step 410 of coupling a shank end of a rod of a concrete anchor driver tool to a rotary hammer drill, and a step 420 of threading a nut onto a threaded concrete anchor bolt of the threaded concrete anchor. Method 400 also includes a step 430 of slipping a socket end of a socket provided on the rod over the nut. Method 400 also includes a step 440 of using the rotary hammer drill in hammer mode to apply hammer pressure to the threaded concrete anchor bolt through the rod, to drive the threaded concrete anchor bolt into the concrete. Method 400 can include many other steps. In some embodiments, method 400 includes the step of using the rotary hammer drill in rotate mode to rotate the rod, where the socket is rotated in response to the rod being rotated. In some embodiments, the nut is driven by the socket and tightened on the threaded concrete anchor bolt in response to the socket being rotated. In some embodiments, method 400 includes the step using the rotary hammer drill in rotate mode to rotate the rod, where the socket is rotated in response to the rod being rotated and where the nut is driven by the socket and tightened on the concrete anchor bolt in response to the socket being rotated. In some embodiments, method 400 includes the step of rotating the socket to tighten the nut on the threaded concrete anchor bolt. In some embodiments, method 400 includes the step of tightening the nut on the threaded concrete anchor bolt using the concrete anchor driver tool.

Disclosed are concrete anchor driver tools that include a rod, a socket a compressible spring, and a spring retaining device. The rod includes a multi-faceted bolt head end and a shank end, where the shank end is configured to couple to a rotary hammer drill, or other drill-type device which has both hammering (pounding) capabilities and rotation (drilling) capabilities. The socket and the spring slide over the rod and are retained on the rod by the spring retaining device and the multi-faceted bolt head end. In some embodiments the spring retaining device is a retaining ring and a washer. The socket includes a drive end with a drive opening and a socket end opposing the drive end with a socket opening. The drive opening is large enough for the shank end of the rod to pass through, but the drive opening is not large enough for the multi-faceted bolt head end of the rod to pass through. The socket opening is multi-faceted shaped to engage the multi-faceted bolt end of the rod. The socket is slidably received on the rod through the drive opening of the socket. The compressible spring is slid over the rod such that the spring is positioned between the spring retaining device and the socket, and where the spring biases the drive end of the socket to be pressed against the multi-faceted bolt head end of the rod.

The disclosed concrete anchor driver tools eliminate the use of a hammer and a wrench or ratchet wrench during concrete anchor installation, minimizing the number of tools required to install the concrete anchor. And, the concrete anchor driver tools allow the installer to stand throughout the installation process, letting the rotary hammer drill and the concrete anchor driver tool do the work instead of manual labor on hands and knees.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A method of installing a threaded concrete anchor into concrete comprising:

coupling a shank end of a rod of a concrete anchor driver tool to a rotary hammer drill;

threading a nut onto a threaded concrete anchor bolt of the threaded concrete anchor;

slipping a socket end of a socket provided on the rod over the nut; and using the rotary hammer drill in hammer mode to apply hammer pressure to the threaded concrete anchor bolt through the rod to drive the threaded concrete anchor bolt into the concrete.

2. The method of claim 1, further comprising using the rotary hammer drill in rotate mode to rotate the rod, wherein the socket is rotated in response to the rod being rotated.

3. The method of claim 2, wherein the nut is driven by the socket and tightened on the threaded concrete anchor bolt in response to the socket being rotated.

4. The method of claim 1, wherein the socket prevents the nut from rotating when the socket is not rotating.

5. The method of claim 1, further comprising rotating the socket to tighten the nut on the threaded concrete anchor bolt.

6. The method of claim 1, further comprising tightening the nut on the threaded concrete anchor bolt using the concrete anchor driver tool.

7. A method of installing a threaded concrete anchor into concrete comprising:

coupling a shank end of a rod of a concrete anchor driver tool to a rotary hammer drill;

threading a nut onto a threaded concrete anchor bolt of the threaded concrete anchor;

slipping a socket end of a socket provided on the rod over the nut; and using the rotary hammer drill in hammer mode to apply hammer pressure to the threaded concrete anchor bolt through the rod to drive the threaded concrete anchor bolt into the concrete, wherein the concrete anchor driver tool further comprises:

a multi-faceted bolt head end of the rod opposing the shank end;

a multi-faceted socket opening of the socket end to engage the multi-faceted bolt head end; and a drive end opposing the socket end, wherein the drive end comprises a round drive end opening, and wherein the socket is slidably received on the rod through the round drive end opening;

a spring retaining device coupled to the rod between the multi-faceted bolt head end and the shank end; and a compressible spring biased between the spring retaining device and the socket in order to hold the socket drive end pressed against the multi-faceted bolt head end of the rod.

8. The method of claim 7, further comprising using the rotary hammer drill in rotate mode to rotate the rod, wherein the socket is rotated in response to the rod being rotated.

9. The method of claim 8, wherein the nut is driven by the socket and tightened on the threaded concrete anchor bolt in response to the socket being rotated.

10. The method of claim 7, wherein the socket prevents the nut from rotating when the socket is not rotating.

11. The method of claim 7, further comprising rotating the socket to tighten the nut on the threaded concrete anchor bolt.

12. The method of claim 7, further comprising tightening the nut on the threaded concrete anchor bolt using the concrete anchor driver tool.

* * * * *